United States Patent [19]

Tande

[11] Patent Number: 4,635,372
[45] Date of Patent: Jan. 13, 1987

[54] APPARATUS FOR POSITIONING AN ELECTRICAL BOX

[76] Inventor: Myron Tande, Box 1000, Stanley, N. Dak. 58784

[21] Appl. No.: 826,609

[22] Filed: Feb. 6, 1986

[51] Int. Cl.$^4$ .......................... B25B 11/00; B25B 1/00
[52] U.S. Cl. ............................. 33/180 R; 33/DIG. 10; 269/50
[58] Field of Search ..................... 33/180 R, 528, 562, 33/DIG. 10; 269/6, 50, 74, 79, 80, 82

[56] References Cited

U.S. PATENT DOCUMENTS

| | | | |
|---|---|---|---|
| 2,919,913 | 1/1960 | Phair | 269/115 |
| 2,956,798 | 10/1960 | Briggs | 269/190 |
| 2,962,281 | 11/1960 | Hodgson | 269/50 |
| 2,990,172 | 6/1961 | Gianotta | 269/116 |
| 3,154,304 | 10/1964 | Crawford | 269/47 |
| 3,436,070 | 4/1969 | Utley | 269/8 |
| 3,601,386 | 8/1971 | Estep | 269/6 |
| 3,617,044 | 11/1971 | Strange | 269/6 |
| 3,751,026 | 8/1973 | Stickney | 269/97 |
| 3,875,669 | 4/1975 | Hull | 33/DIG. 10 |
| 3,954,717 | 5/1976 | Tarr | 269/82 |
| 4,181,295 | 1/1980 | Duffy | 269/3 |
| 4,290,591 | 9/1981 | Smith | 269/6 |
| 4,384,396 | 5/1983 | Smolik | 29/407 |
| 4,404,751 | 9/1983 | Rieckenberg | 33/180 R |
| 4,479,639 | 10/1984 | Kane | 269/6 |

Primary Examiner—Richard R. Stearns
Attorney, Agent, or Firm—Zarley, McKee, Thomte, Voorhees & Sease

[57] ABSTRACT

An apparatus is described for use in positioning an electrical box such as an outlet box or a switch box at either side of a vertically disposed stud and at a predetermined distance outwardly from the stud for compensation for various wall thicknesses. The apparatus comprises a U-shaped member which is selectively vertically mounted on a vertically disposed support such as a post or rod. Threaded positioning pins extend from the U-shaped member to enable the apparatus to be positioned relative to the stud to compensate for various wall thicknesses. The U-shaped member includes retaining pins upon which the electrical box is removably mounted. When the electrical box has been positioned on the retaining pins, the apparatus is positioned adjacent the wall stud and the box is secured to the stud by nails or the like. The apparatus may then be removed from the installed box. The apparatus may be rotated 180° to facilitate the installation of switch boxes as well.

6 Claims, 9 Drawing Figures

APPARATUS FOR POSITIONING AN ELECTRICAL BOX

BACKGROUND OF THE INVENTION

1. Field of the Invention

This invention relates to an apparatus for positioning electrical boxes such as outlet or switch boxes on building studs.

2. Description of the Prior Art

Electrical boxes such as outlet boxes or switch boxes are normally attached to wall studs in buildings before the sheetrock, paneling, etc. is installed. One problem associated with the installation of the electrical boxes is in the positioning of the boxes adjacent the studs so that the box may be secured to the stud. A further problem associated with the installation of the boxes is that the box must be moved inwardly or outwardly relative to the stud depending upon the thickness of the wall covering to be subsequently installed. Yet another problem with the prior art devices is that they are normally designed for either the installation of switch boxes or outlet boxes and are not designed for the installation of both types of boxes.

Still another disadvantage of the prior art devices is that they can normally only be used to position the box at either the right or left side of the building stud. Yet another disadvantage of the prior art devices is that the devices themselves interfere with the installation of the outlet or switch box on the stud.

SUMMARY OF THE INVENTION

The invention disclosed herein consists of a relatively simple jig, tool or apparatus which may be used to mount either switch boxes or outlet boxes on either the right or left sides of a building stud. The apparatus consists of a U-shaped member vertically adjustably secured on a support post which is placed into engagement with the floor outwardly of and at one side of the stud to which the electrical box is to be secured. The U-shaped member comprises upper and lower legs which movably embrace the support post and which have a vertically disposed base portion extending between the inner ends thereof. Means is provided on the U-shaped member for yieldably maintaining the electrical box thereon in the proper position relative to the stud to enable the electrical box to be secured to the stud.

A principal object of the invention is to provide an apparatus for positioning an electrical box such as an outlet box or a switch box or either side of a vertically disposed building stud.

A further object of the invention is to provide an apparatus of the type described which is vertically adjustable.

Still another object of the invention is to provide an apparatus of the type described including means which frictionally maintains the electrical box thereon to facilitate the box to be positioned adjacent the building stud and secured thereto by nails or the like.

Still another object of the invention is to provide an apparatus of the type described which is economical of manufacture and convenient to use.

These and other objects will be apparent to those skilled in the art.

DESCRIPTION OF THE PREFERRED EMBODIMENT

Figure 1:
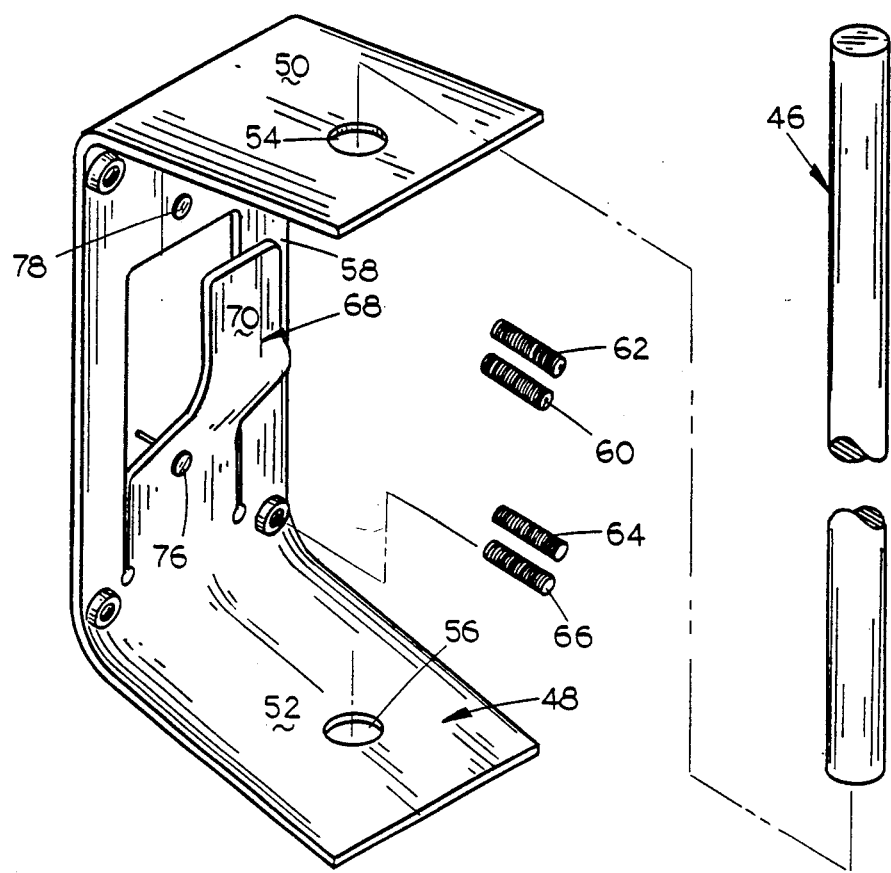
FIG. 1 is an exploded perspective view of the apparatus of this invention.
Figure 2:
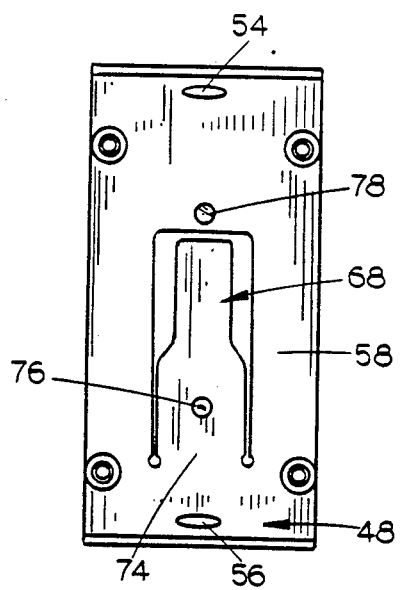
FIG. 2 is a rear view of the U-shaped member which is mounted on the vertically disposed support post.
Figure 3:
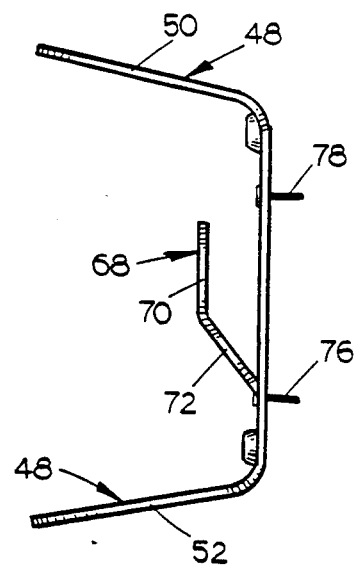
FIG. 3 is a side view of the U-shaped member of FIG. 2.

The apparatus of this invention is referred to generally by the reference numeral 10. Apparatus 10 is ideally suited for use in mounting either an electrical outlet box 12 or a switch box 14 adjacent either side of a building stud 16. Details of the conventional outlet box 12 are perhaps best seen in FIG. 5 wherein it can be seen that the box 12 includes a back wall 18, top walls 20 and 22, opposite side walls 26, and an open front portion 28. Box 12 includes a pair of mounting brackets 30 and 32 provided at its upper and lower ends adapted to receive nails 34 and 36 therein which are driven into the side of the stud 16 to maintain the box 12 in the desired position. Box 12 also is provided with a pair of mounting ears or flanges 38 and 40 at its front end having threaded openings 42 and 44 provided therein for receiving mounting screws designed to secure the face plate thereto.

Figure 5:
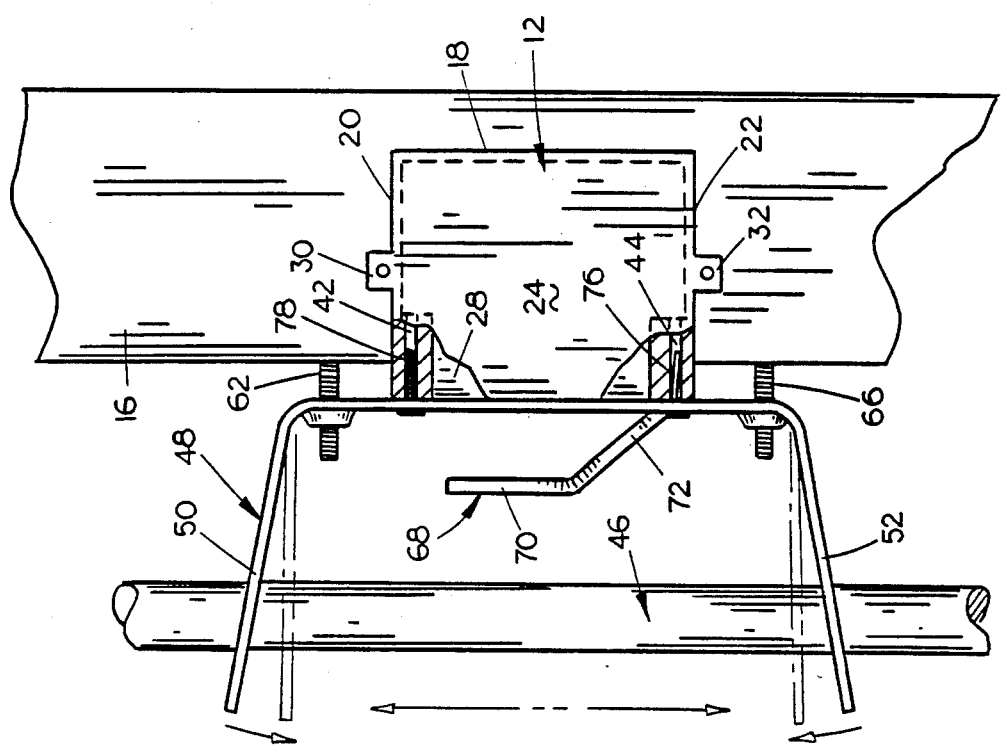
FIG. 5 is a side view of the apparatus seen in FIG. 4 with the broken line illustrating the manner in which the legs of the U-shaped member may be moved to facilitate the vertical movement of the U-shaped member.
Figure 4:
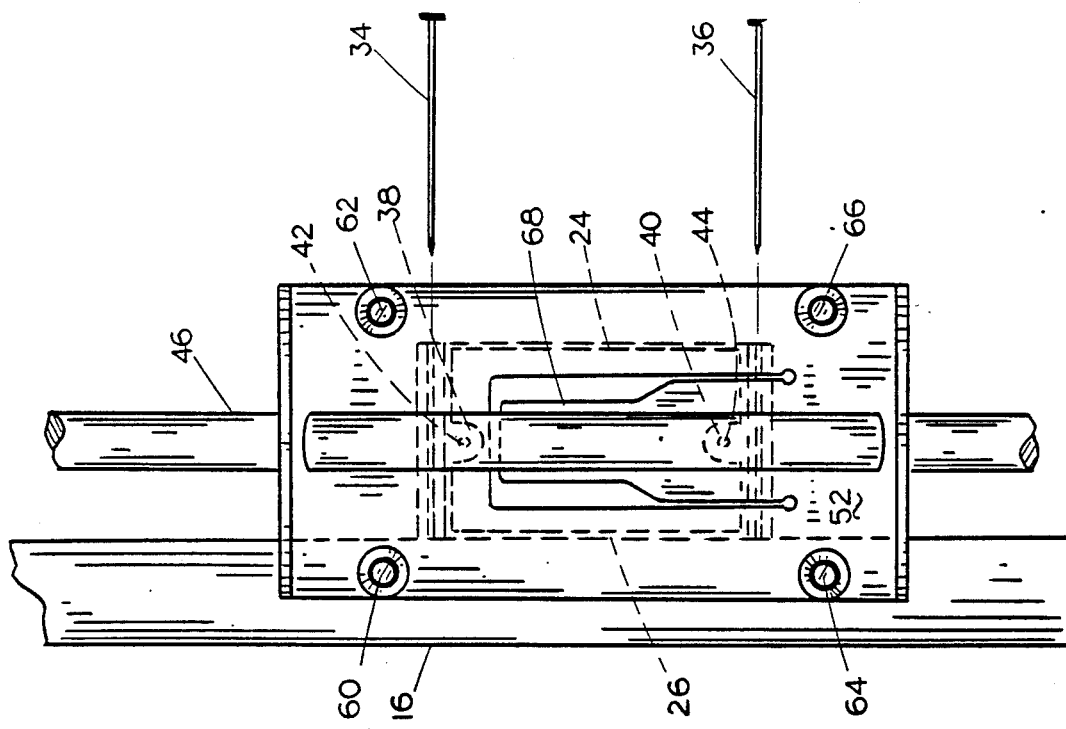
FIG. 4 is a rear view illustrating the apparatus of this invention being used to position an electrical box adjacent a building stud.

Apparatus 10 includes a vertically disposed support post or rod 46 having a U-shaped member 48 selectively vertically movably mounted thereon. U-shaped member includes upper and lower legs 50 and 52 respectively having openings 54 and 56 which receive post 46 as illustrated in the drawings. Base portion 58 extends between the inner ends of the upper and lower legs 50 and 52 as also seen in the drawings. U-shaped member 48 is preferably constructed of a deformable material such as thermoplastic or the like which has sufficient rigidity yet which may be deformable and yet return to its original position. FIG. 5 illustrates the manner in which the legs 50 and 52 embrace the post 46 to maintain the U-shaped member in its desired vertical position relative to the post 46. When it is desired to move the U-shaped member 48 relative to the post 46, the legs 50 and 52 are moved together as illustrated by the broken lines and the U-shaped member 48 is then moved to its desired position. The legs 50 and 52 are then released and the legs returned to their original position as illustrated by dotted lines in FIG. 5 to maintain the U-shaped member 48 in position.

Member 48 is provided with a pair of threaded positioning members 60 and 62 at the upper end of base portion 58 and a pair of threaded positioning members 64 and 66 provided in the lower end of base portion 58.

Figure 6:
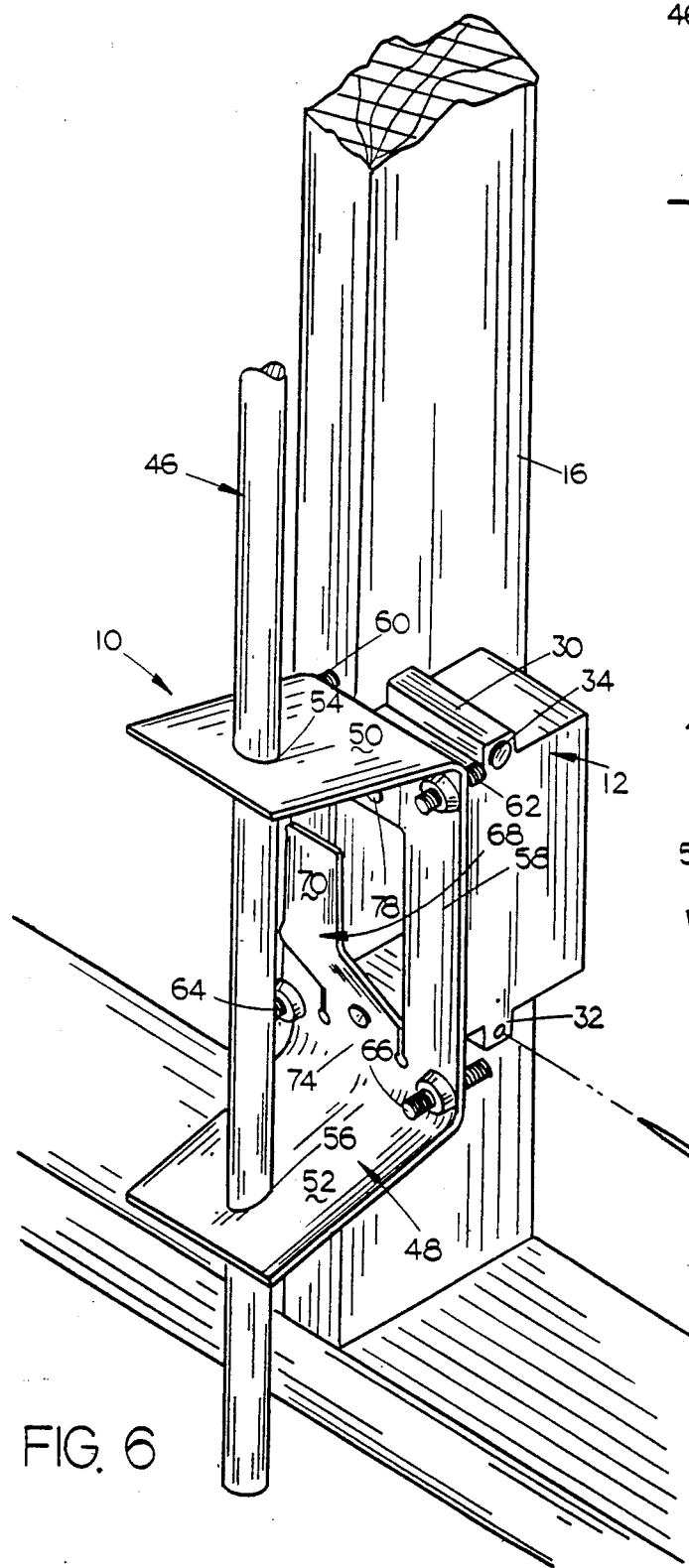
FIG. 6 is a pespective view illustrating the apparatus of this invention being used to position an electrical box adjacent a building stud.
Figure 7:
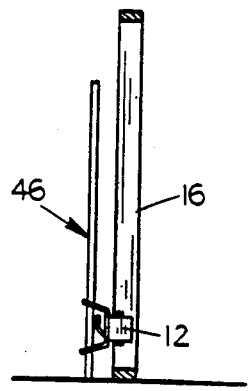
FIG. 7 is a side view illustrating the apparatus of this invention being used to position an electrical outlet box adjacent a building stud.
Figure 8:
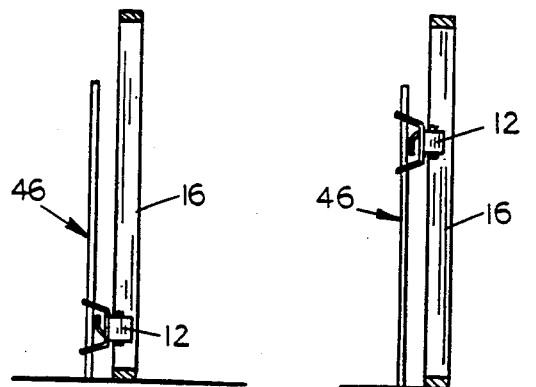
FIG. 8 is a side view similar to FIG. 7 except that the apparatus has been inverted to facilitate the positioning of a switch box adjacent the building stud.
Figure 9:
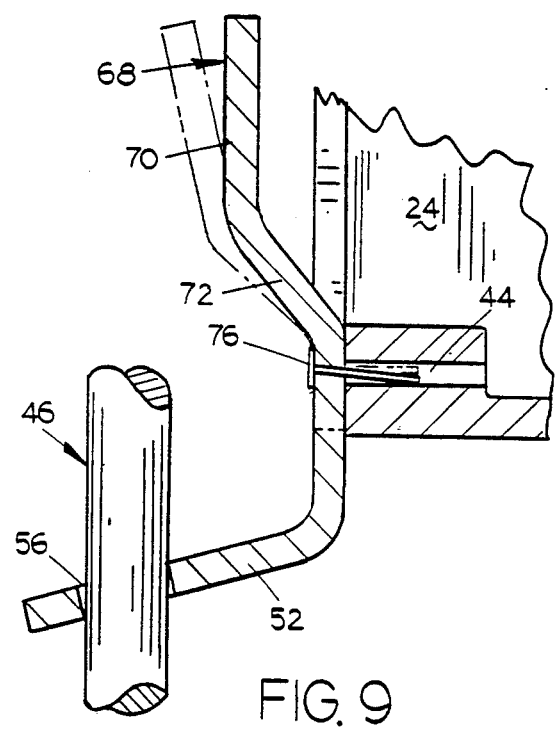
FIG. 9 is a partial sectional view illustrating the manner in which the resilient tab portion of the U-shaped member may be moved relative to the U-shaped member.

Base portion 58 is provided with a resilient tab portion 68 having an upper end portion 70, intermediate portion 72 and lower end portion 74. Retaining pin 76 is secured to the lower end portion 74 of tab 68 and extends therefrom at less than a 90° angle relative to the base portion 58 when the tab portion 68 is in its normal position as illustrated in FIGS. 5 and 6. The retaining pin 78 is secured to base portion 58 above tab 68 as illustrated in FIGS. 5 and 6.

In use, the U-shaped member 48 is positioned on the post 46 as desired. The positioning pins 60, 62, 64 and 66 are threadably moved relative to the base portion 58 so that the box 12 will be properly positioned depending upon the particular thickness of the wall covering which is to be installed on the stud 16. For example, if ¾ inch wall board is to be mounted on the stud 16, the positioning pins 60, 62, 64 and 66 will be threadably moved until the inner ends thereof are positioned approximately ¾ inch from the inner surface of the base portion 58. The box 12 is then secured to the device by grasping the upper end portion 70 of the tab portion 68 and moving the same away from the base portion 58 until the retaining pin 76 is substantially horizontally disposed. Box 12 is then positioned relative to the apparatus so that the retaining pins 78 and 76 are received in the threaded openings 42 and 44 respectively. Tab portion 68 is then released which causes the retaining pin 76 to move downwardly into frictional engagement with the threaded opening 44 which causes the box 12 to be securely attached to the apparatus 10.

The apparatus may then either be positioned on the right or left side of the stud 16 with either positioning pins 60 and 64 or 62 and 66 being brought into engagement with the outer surface of the stud 16 as illustrated in FIG. 5. The nails 34 and 36 are then positioned in the mounting brackets 30 and 32 and driven into the side of the stud 16. Tab portion 68 is then again deflected to facilitate the removal of the apparatus from the mounted box 12. In most instances, however, it will not be necessary to deflect the tab portion 68 at this time since the apparatus may be simply pulled from the box 12.

The apparatus of this invention may be used for the installation of switch boxes as well and if properly designed, the U-shaped member 48 need not be vertically adjusted on the post 46 when a switch box is to be mounted. For example, if the center of the apparatus is positioned 12 inches from one end of a 5 foot shaft 46, it may be rotated 180° so that the apparatus may be used to position a switch box 48 inches from the floor. It can also be seen that the apparatus may be used to position either metal or plastic outlet or switch boxes at either side of a wall stud and has the ability to compensate for various wall thicknesses.

Thus it can be seen that a novel apparatus has been described which accomplishes at least all of its stated objectives.

I claim:

1. An apparatus for positioning an electrical box in a selected position for mounting on a vertically disposed stud, the electrical box including at least one threaded opening at its upper forward end and at least one threaded opening at its lower forward end, comprising,
   an elongated vertically disposed support means adapted to be positioned outwardly of and at one side of the vertically disposed stud,
   a substantially U-shaped member selectively vertically mounted on said support means comprising upper and lower legs movably mounted on said support means which extend laterally inwardly therefrom towards the stud, and a vertically disposed base portion extending between the inner ends of said legs,
   at least one length adjustable positioning member secured to said base portion and extending therefrom for engagement with the stud to enable the apparatus to compensate for wall thickness,
   said base portion having a resilient tab portion, having upper and lower ends, joined at its lower end to said base portion,
   a first box retaining pin means secured to said base portion extending horizontally inwardly therefrom adapted to be received by said upper threaded opening of said box,
   a second box retaining pin means secured to said tab portion, below the upper end thereof, extending inwardly therefrom at an angle less than 90°,
   said second box retaining pin means being horizontally disposed when said tab portion is moved relative to said base portion to enable said second box retaining pin means to be received by said lower threaded opening,
   said second box retaining pin means frictionally engaging said lower threaded opening, when said tab portion returns to its normal position so that said box is held by said first and second retaining pin means whereby said box may be positioned adjacent said stub by moving said support means relative thereto.

2. An apparatus for positioning an electrical box in a selected position for mounting on a vertically disposed stud, the electrical box including at least one opening at its upper forward end and at least one opening at its lower forward end, comprising,
   an elongated vertically disposed support means adapted to be positioned outwardly of and at one side of the vertically disposed stud,
   a substantially U-shaped member selectively vertically mounted on said support means comprising upper and lower legs movably mounted on said support means which extend laterally inwardly therefrom towards the stud, and a base portion extending between the inner ends of said legs,
   said base portion having a resilient tab portion, having upper and lower ends, joined at its lower end to said base portion,
   a first box retaining pin means secured to said base portion extending horizontally inwardly therefrom adapted to be received by said upper opening of said box,
   a second box retaining pin means secured to said tab portion, below the upper end thereof, extending inwardly therefrom at an angle less than 90°,
   said second box retaining pin means being horizontally disposed when said tab portion is moved, to a first position, relative to said base portion to enable said second box retaining pin means to be received by said lower opening, said second box retaining pin means frictionally engaging said lower opening, when said tab portion returns to its normal position so that said box is held by said first and second retaining pin means whereby said box
may be positioned adjacent said stud by moving said support means relative thereto.

3. The apparatus of claim 2 wherein the upper and lower openings in the electrical box are threaded.

4. The apparatus of claim 2 wherein said support means has a length sufficient so that it may be used to position either an outlet box or a switch box adjacent the stud.

5. The apparatus of claim 2 wherein a pair of vertically spaced, length adjustable positioning members extend inwardly from said base portion for engagement with the stud.

6. The apparatus of claim 2 wherein said upper and lower legs are flexible.

* * * * *